(12) United States Patent
Yoon et al.

(10) Patent No.: US 9,352,778 B2
(45) Date of Patent: May 31, 2016

(54) LANE KEEPING ASSIST SYSTEM AND METHOD

(71) Applicant: HYUNDAI MOBIS Co., Ltd., Yongin-si (KR)

(72) Inventors: Jang Yeol Yoon, Yongin-si (KR); Kwang Keun Joseph Shin, Rochester Hills, MI (US)

(73) Assignee: HYUNDAI MOBIS CO., LTD., Yongin-si (KR)

( * ) Notice: Subject to any disclaimer, the term of this patent is extended or adjusted under 35 U.S.C. 154(b) by 204 days.

(21) Appl. No.: 13/866,755

(22) Filed: Apr. 19, 2013

(65) Prior Publication Data

US 2013/0317698 A1 Nov. 28, 2013

(30) Foreign Application Priority Data

May 23, 2012 (KR) .................. 10-2012-0054630

(51) Int. Cl.
*B62D 15/02* (2006.01)
*B62D 6/00* (2006.01)

(52) U.S. Cl.
CPC .............. *B62D 15/025* (2013.01); *B62D 6/003* (2013.01)

(58) Field of Classification Search
CPC ................................. B62D 6/00; B62D 6/003
See application file for complete search history.

(56) References Cited

U.S. PATENT DOCUMENTS

| | | | | |
|---|---|---|---|---|
| 5,243,524 A * | 9/1993 | Ishida | ................... | G05D 1/0212 180/169 |
| 5,350,912 A * | 9/1994 | Ishida | ................... | B62D 6/00 180/170 |
| 2006/0030987 A1 | 2/2006 | Akita | | |
| 2009/0157263 A1* | 6/2009 | Shin | ................... | B62D 5/0481 701/43 |
| 2011/0264329 A1* | 10/2011 | Limpibunterng | ...... | B62D 5/008 701/41 |
| 2012/0022739 A1* | 1/2012 | Zeng | ................... | B60W 30/12 701/536 |
| 2012/0029773 A1* | 2/2012 | Fujita | ................... | B60W 30/12 701/41 |
| 2012/0123643 A1* | 5/2012 | Limpibuntering | ..... | B62D 1/286 701/42 |
| 2012/0203431 A1* | 8/2012 | Kojo | ................... | B62D 15/025 701/41 |
| 2013/0261898 A1* | 10/2013 | Fujita | ................... | B62D 6/003 701/42 |
| 2014/0229069 A1* | 8/2014 | Akiyama | .................. | B60T 7/12 701/41 |
| 2014/0236428 A1* | 8/2014 | Akiyama | ............... | G08G 1/165 701/42 |

FOREIGN PATENT DOCUMENTS

| | | |
|---|---|---|
| CN | 101778753 A | 7/2010 |
| DE | 43 00 941 A1 | 7/1993 |
| JP | 2007-296947 A | 11/2007 |
| KR | 10-2009-0027385 | 3/2009 |
| KR | 10-2011-0032707 | 3/2011 |
| KR | 10-2011-0054144 | 5/2011 |
| KR | 10-2011-0062440 | 6/2011 |

\* cited by examiner

*Primary Examiner* — Thomas G Black
*Assistant Examiner* — Ce Li
(74) *Attorney, Agent, or Firm* — NSIP Law

(57) ABSTRACT

The present disclosure relates to a lane keeping assist system for controlling a vehicle on the basis of traveling information and road information of the vehicle when the vehicle begins to leave its lane in order to prevent the vehicle from deviating from its lane, which is a system for assisting the vehicle in keeping the lane by generating multiple target routes each being a path for the vehicle to travel without deviating from the lane, calculating a target yaw rate for each target route, and controls the vehicle according to a target steering angle calculated using the target yaw rate.

10 Claims, 4 Drawing Sheets

LANE KEEPING ASSIST SYSTEM AND METHOD

CROSS-REFERENCE TO RELATED APPLICATIONS

This application claims priority under 35 U.S.C. §119 to Korean Patent Application No. 10-2012-0054630, filed on May 23, 2012, the disclosure of which is incorporated herein by reference in its entirety.

TECHNICAL FIELD

The present disclosure relates to a lane keeping assist system for preventing lane deviation that is unintended by a driver, and in particular to, a lane keeping assist system and method that designs a target route on the basis of a current traveling state of a vehicle, calculates a target yaw rate according to the target route, and controls a steering device of the vehicle according to a target steering angle generated on the basis of the target yaw rate, thus preventing lane deviation of the vehicle.

BACKGROUND

Lane keeping assist system (LKAS) is a system that controls a traveling vehicle to prevent lane deviation of the vehicle when the vehicle is expected to move out of its lane on the basis of its driving information and road information.

A related art LKAS control method includes finding a distance and an angle between a vehicle and a lane using lane information obtained from an imaging device equipped in the vehicle, calculating a lane deviation speed using a traveling direction and speed of the vehicle which is obtained from CAN data of the vehicle, and giving a warning of lane deviation or performing steering control depending on whether the vehicle is out of the lane.

However, the related art control method has a problem in that a control amount is calculated with only a deviation distance and a deviation angle that is an angle between a host vehicle and its lane and thus a controller sensitively operates over a threshold of the lane deviation speed even when the deviation angle is slightly formed. Also, the related art control method uses an experience-based steering torque map to calculate the control amount, and thus can not ensure robustness of control performance against disturbance such as cross wind, road gradient, etc.

There have been proposals for solving these problems by estimating and compensating for expected vehicle behaviors or variables, which however are very sensitive to an error of a camera signal and also have a complicated control algorithm. Thus, the control performance is not expected to be enhanced.

SUMMARY

Accordingly, the present disclosure provides a control algorithm for designing a kinematic-based target route on which a traveling vehicle reaches a front target position and calculating a target yaw rate for following the target route, and thus a target steering angle.

The present disclosure also provides a lane keeping assist system appropriate for a traveling condition, which generates multiple target routes, calculates multiple target yaw rates for each target route, and selects one of the multiple target yaw rates to perform steering control depending on the traveling condition.

In one general aspect, a lane keeping assist system includes: a receiver outputting information about an vehicle and information about a road where the vehicle are traveling on the basis of information received from an image sensor and a vehicle sensor; a target route generator receiving the information output by the receiver and generating a target route of the vehicle; a target yaw rate calculator receiving the target route from the target route generator and calculating a target yaw rate of the vehicle; and a controller determining a time point for lane keeping assist control of the vehicle on the basis of the information output by the receiver, calculating a target steering angle using the target yaw rate received from the target yaw rate, and controlling a steering device according to the target steering angle.

The target route generator may generate multiple target routes for at least one of a path for the vehicle to travel without deviating from the road up to any target and a path for the vehicle to travel without deviating from a given offset distance from the boundary of the road, and the target yaw rate calculator may receive a plurality of targets routes from the target route generator and calculate the target yaw rate for each target route. The controller may select a target yaw rate appropriate for a traveling condition from among the multiple target yaw rates, calculate the target steering angle using the selected target yaw rate, and control a steering device.

The target route generator may calculate a target route using at least one of a distance to any target position of the vehicle, a road curvature to the target position, and a lateral offset of the vehicle, the target yaw rate may calculate a radius of curvature of the target route received from the target route generator and calculate the target yaw rate using the radius of curvature, the controller may calculate the target steering angle using the target yaw rate, the steering angle in a steady state of the vehicle, and a yaw rate in a steady state of the vehicle.

In another general aspect, a lane keeping assist method includes: receiving at least one of an image sensing signal and a vehicle sensing signal of a vehicle and outputting traveling information about the vehicle; generating a target route of the vehicle on the basis of the traveling information; calculating a target yaw rate, a target behavior of the vehicle, on the basis of the target route; determining a lane keeping assist control time on the basis of the traveling information and calculating a target steering angle using the target yaw rate; and controlling a steering device of the vehicle according to the target steering angle.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the following description, the technical terms are used only for explaining a specific exemplary embodiment while not limiting the inventive concept. The terms of a singular form may include plural forms unless specifically mentioned. The meaning of "comprises" and/or "comprising" specifies an element, a step, a process, and/or a component but does not exclude other elements, steps, processes, and/or components. Embodiments of the present invention will be described below in more detail with reference to the accompanying drawings.

Figure 1:
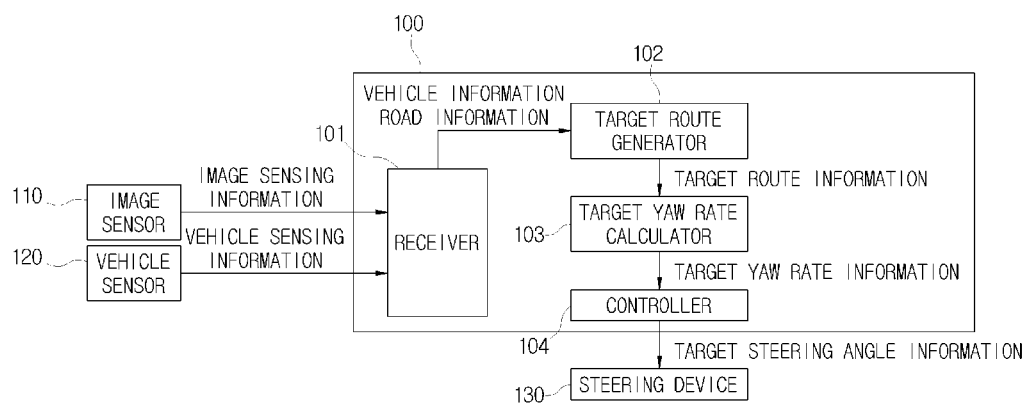
FIG. 1 illustrates a structure of a lane keeping assist system according to an embodiment of the present invention.

FIG. 1 illustrates a structure of a lane keeping assist system according to an embodiment of the present invention.

The lane keeping assist system (LKAS) includes a receiver 101, a target route generator 102, a target yaw rate calculator 103, and a controller 104.

The receiver 101 receives image sensing information and vehicle sensing information from an image sensor 110 and a vehicle sensor 120 of a vehicle.

The image sensor 110 recognizes a front lane in real time, estimates a lateral position, heading angle, road curvature, and lane information of a vehicle on the basis of the lane, and delivers the lateral position, heading angle, road curvature, and lane information of the vehicle to the receiver 101.

The vehicle sensor 120 delivers information about behaviors of the vehicle, such as a traveling direction, speed, etc. of the vehicle, to the receiver 101.

The receiver 101 delivers information about a driving state of a driving vehicle and information about a road on which the vehicle drives, which are delivered from the image sensor 110 and the vehicle sensor 120, to the target route generator 102.

The target route generator 102 generates a target route where the vehicle may travel without leaving its lane, on the basis of traveling information about the vehicle and information about the road which are delivered from the receiver 101. In this case, the target route generator 102 may generate a target route for traveling in a given offset distance from the lane such that the vehicle may travel safely in the lane. Accordingly, the target route generator may generate a several number of target routes and control the vehicle on the basis of one target route thereamong.

Figure 2:
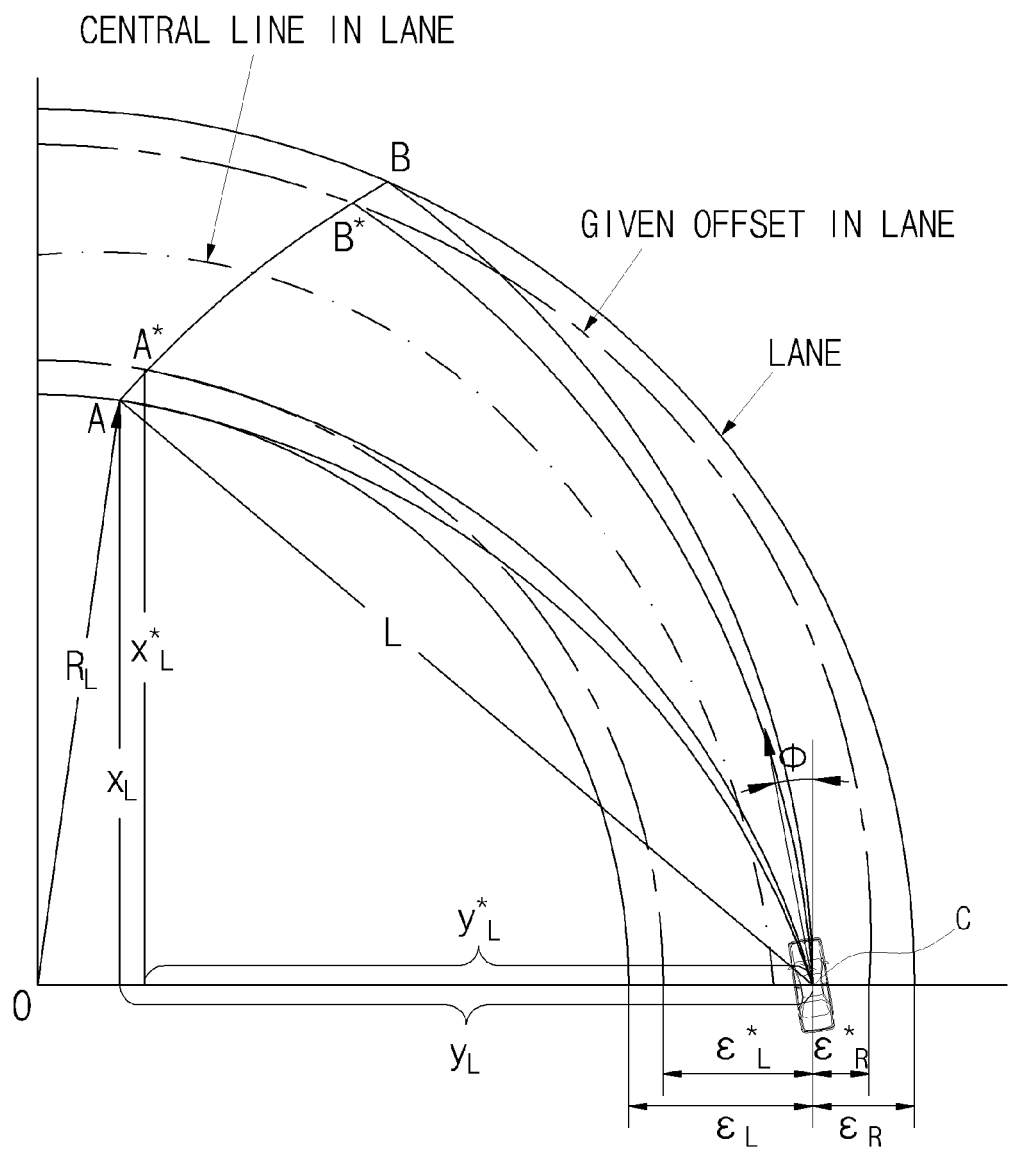
FIG. 2 illustrates a method of generating multiple target routes, using the lane keeping assist system according to an embodiment of the present invention.

FIG. 2 illustrates a method of generating multiple target routes in the lane keeping assist system.

In FIG. 2, if a current position of a vehicle is C and any target distance of the vehicle is L, target points for a vehicle to travel without deviating from its lane may be depicted as A and B. Also, target points for a vehicle to travel without deviating from a given offset distance from the lane may be depicted A* and B*. Accordingly, the target route may be generated as a route to reach target points A, B, A*, and B*.

A coordinate (x, y) on a target circular route to reach target points A, B, A*, and B* may be calculated using Equation (1) and Equation (2).

$$\begin{cases} x_i = \sqrt{L^2 - y_i^2} \\ x_i^* = \sqrt{L^2 - y_i^{*2}} \end{cases} \quad (i = L, R) \tag{1}$$

$$\begin{cases} y_i = \dfrac{L^2 - \varepsilon_i^2 - 2\varepsilon_i(R_i - \varepsilon_i)}{2(R_i - \varepsilon_i)} = \dfrac{\rho_i(L^2 - \varepsilon_i^2)}{2(1 - \rho_i\varepsilon_i)} - \varepsilon_i \\ y_i^* = \dfrac{L^2 - \varepsilon_i^{*2} - 2\varepsilon_i^*(R_i^* - \varepsilon_i^*)}{2(R_i^* - \varepsilon_i^*)} = \dfrac{\rho_i^*(L^2 - \varepsilon_i^{*2})}{2(1 - \rho_i^*\varepsilon_i^*)} - \varepsilon_i^* \end{cases} \quad (i = L, R) \tag{2}$$

where $(x_i, y_i)$ is a coordinate on a target route to reach target points A and B, $(x_i^*, y_i^*)$ is a coordinate on a target route to reach target points A* and B*, $\rho_i$ ($\rho_i=1/R_i$) is a road curvature of a target point, and $\varepsilon_i$ is a vehicle lateral offset.

The target route generator 102 delivers information about multiple target routes generated by the above equations, to the target yaw rate calculator 103.

The target yaw rate calculator 103 calculates a target yaw rate, which is a target behavior of a vehicle, using multiple target routes received from the target route generator 102 and vehicle information and road information delivered through the target route generator 102.

The target yaw rate calculator 103 calculates a radius of curvature of a target circular route received from the target route generator 102 and then calculates a target yaw rate using the radius of curvature.

Figure 3:
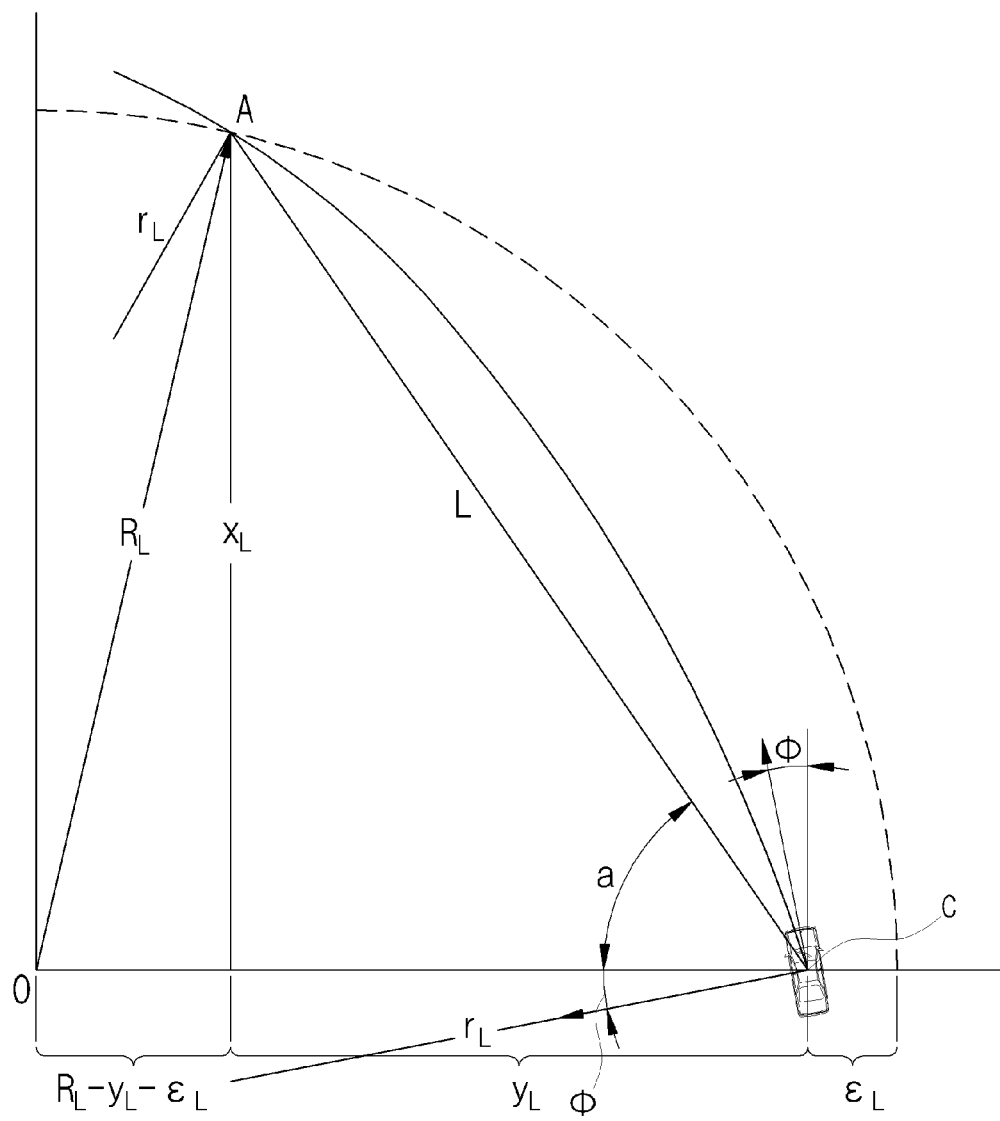
FIG. 3 illustrates a method of finding a radius of curvature of a target route to calculate a target yaw rate, using the lane keeping assist system according to an embodiment of the present invention.

FIG. 3 illustrates a method by which the target yaw rate calculator 103 calculates a radius of curvature of a target circular route.

Where a radius of curvature of a target route $\overset{\frown}{AC}$ is $r_L$, an angle between $\overline{OC}$ and $\overline{AC}$ is $\alpha$, a deviation angle between a vehicle and its lane is $\phi$, and a distance from a target point is L, relationships between them may be expressed as Equation (3).

$$r_L \cos(\phi+\alpha) = L/2 \tag{3}$$

Accordingly, a curvature $\rho_{k,L}$ of a circular route to reach a target point may be expressed as Equation (4).

$$\rho_{kL} = \frac{1}{r_L} = \frac{2}{L^2}(y_L\cos\phi - x_L\sin\phi) \tag{4}$$

where $x_L = L \sin \alpha$ and $y_L = L \cos \alpha$.

Accordingly, curvatures of circular routes to reach target points A, B, A*, and B* may be expressed as Equation 5.

$$\begin{cases} \rho_{k,i} = \dfrac{2}{L^2}(y_i\cos\phi - x_i\sin\phi) \\ \\ \rho_{k,i}^* = \dfrac{2}{L^2}(y_i^*\cos\phi - x_i^*\sin\phi) \end{cases} \quad (i = L, R) \tag{5}$$

When a curvature of a target circular route is calculated by the above method, a target yaw rate may be calculated by multiplying the curvature by a speed of a vehicle, and thus the multiple target yaw rate $YR_{d,i}$ may be calculated by Equation (6).

$$\begin{cases} YR_{d,i} = \rho_{k,i} \cdot v_x \\ YR_{d,i}^* = \rho_{k,i}^* \cdot v_x \end{cases} \quad (i = L, R) \tag{6}$$

The target yaw rate calculator 103 delivers information about multiple target yaw rates calculated by the above process, to the controller 104.

The controller 104 receives multiple target yaw rates from the target yaw rate calculator 103 and monitors a driving state of a vehicle to determine a time point of applying a lane keeping assist system. The controller 104 selects a target yaw rate appropriate for a driving condition from among multiple target yaw rates and calculates a target steering angle on the basis of the selected target yaw rate when the vehicle begins to move out of its lane, and thus the controller 104 determines that it is a time to apply the system.

The target steering angle is calculated by Equation (7).

$$\delta_{cmd} = k_p(\delta_{ss}/YR_{SS})YR_d \quad (7)$$

where $\delta_{cmd}$ is a target steering angle, $k_p$ is a proportional gain that is a control gain, $\delta_{ss}$ is a steering angle in a steady state, $YR_{SS}$ is a yaw rate in a steady state, and $YR_d$ is a target yaw rate.

The controller 104 controls a steering device 130 by delivering information about the target steering angle to the steering device 130, to assist a vehicle in traveling without deviating from its lane.

Figure 4:
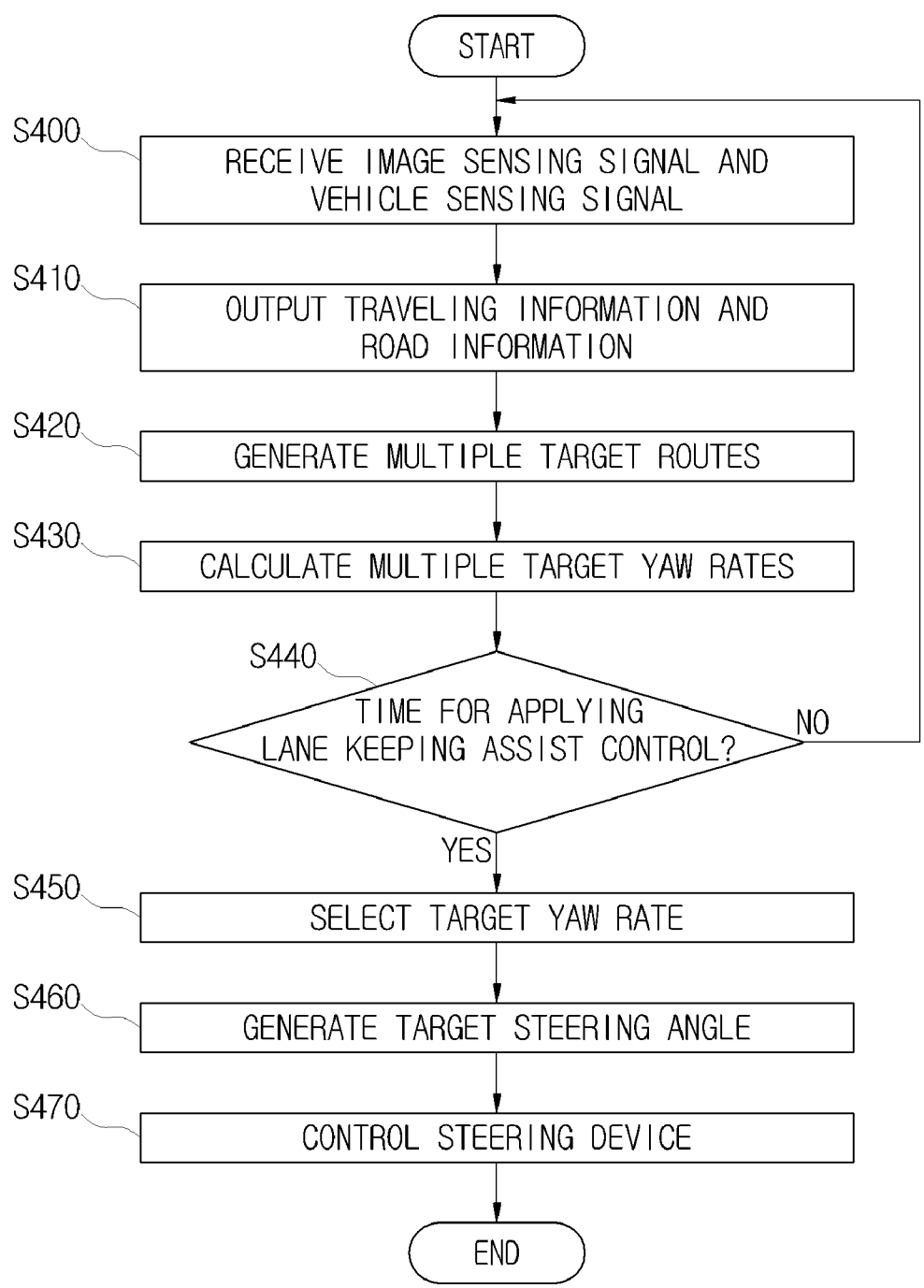
FIG. 4 is a flowchart illustrating a lane keeping assist method according to an embodiment of the present invention.

FIG. 4 is a flowchart illustrating a lane keeping assist method according to an embodiment of the present invention.

To control lane keeping of a vehicle, the lane keeping assist system receives an image sensing signal and a vehicle sensing signal from an image sensor and a vehicle sensor of a vehicle in operation S400. The lane keeping assist system estimates lane information, location information about the vehicle in the lane, and a road curvature, estimates information such as a traveling direction and speed of the vehicle from the vehicle sensing signal, and outputs traveling information and road information in operation S410.

The lane keeping assist system generates a target circular route related to a path for the vehicle to travel without deviating from its lane or a path to travel without deviating from a given offset distance from the lane on the basis of the traveling information and road information in operation S420. The target circular route may be generated on the basis of a distance to any target position, a radius of curvature of the road, a vehicle lateral offset.

The lane keeping assist system calculates the curvatures of the multiple target circular routes and multiplies each curvature by a speed of the traveling vehicle to calculate a target yaw rate depending on each target route in operation S430.

The lane keeping assist system monitors whether the vehicle deviates from its lane, determines that it is a time to apply the lane keeping assist time when the vehicle begins to move out of its lane, and selects a target yaw rate appropriate for a traveling condition from among multiple target yaw rates for the multiple target circular route in operation S450, and calculates a target steering angle on the basis of the selected target yaw rate in operation S460.

The target steering angle may be calculated using the target yaw rate, the steering rate and yaw rate in a steady state, and the proportional gain.

The lane keeping assist system controls a steering device according to the target steering angle to assist the vehicle in traveling in operation S470, thereby helping the vehicle to travel without deviating from its lane.

The present invention provides a lane keeping assist system that is robust to errors by controlling lane keeping of the vehicle using a target yaw rate and provides a lane keeping assist system appropriate for a traveling condition by selecting a target yaw rate appropriate from the traveling condition from among multiple target yaw rates to control the steering device.

It is advantageously possible to selectively use a variable target distance to easily tune control strength and sensitivity disclosure suitable for a user's request and provide a control algorithm that may be very simply implemented. Furthermore, the present invention can be applied to an autonomous driving technology such as autonomous driving and automatic lane change technology.

The above-disclosed subject matter is to be considered illustrative, and not restrictive, and the appended claims are intended to cover all such modifications, enhancements, and other embodiments, which fall within the true spirit and scope of the present invention. Accordingly, embodiments of the present invention are intended not to limit, but to explain the technical spirit of the present invention. The scope of the present invention is not limited by these embodiments. The scope of the invention should be construed in accordance with the following claims, and all technical ideas should be construed as covering all the modifications, equivalents, and replacements within the scope of the present invention.

What is claimed is:

1. A lane keeping assist system, comprising:
   a receiver outputting information about an vehicle and information about a road where the vehicle are traveling on the basis of information received from an image sensor and a vehicle sensor;
   a target route generator receiving the information output by the receiver and generating a target route of the vehicle;
   a target yaw rate calculator receiving the target route from the target route generator and calculating a target yaw rate of the vehicle; and
   a controller determining a time point for starting lane keeping assist control of the vehicle on the basis of the information output by the receiver, calculating a target steering angle using the target yaw rate received from the target yaw rate calculator, and controlling a steering device according to the target steering angle,
   wherein the target yaw rate calculator calculates a radius of curvature of the target route received from the target route generator and calculates the target yaw rate using the radius of curvature,
   wherein the target yaw rate calculator calculates the radius of curvature using a distance to any target position of the vehicle and a deviation angle between the vehicle and the road, and,
   wherein the target yaw rate calculator calculates the radius of curvature of the target route using the following equation:

$$R \cdot \cos(\phi + \alpha) = L/2$$

where R is a radius of curvature, $\phi$ is a deviation angle, $\alpha$ is an angle between a straight line to a target position and a straight line to a center of a circle having a road as an arc, and L is a distance to the target position;
   wherein the target route generator calculates the target route using a distance to any target position of the vehicle, the road curvature to the target position, and a lateral offset of the vehicle, and,
   wherein the target route generator calculates coordinate $(x_i, y_i)$ on the target route for the vehicle to travel without deviating from the road to any target position, by the following equation:

$$x_i = \sqrt{L^2 - y_i^2}, \quad y_i = \frac{\rho_i(L^2 - \varepsilon_1^2)}{2(1 - \rho_i \varepsilon_i)} - \varepsilon_i$$

where L is any target distance, $\rho_i$ is a road curvature, and e is a lateral offset of a vehicle.

2. The lane keeping assist system of claim 1, wherein the target yaw rate calculator calculates the target yaw rate by multiplying the curvature of the target route and a speed of the vehicle.

3. The lane keeping assist system of claim 1, wherein the target yaw rate calculator updates the target yaw rate in real time during traveling of the vehicle.

4. The lane keeping assist system of claim 1, wherein the controller calculates the target steering angle using the target yaw rate, the steering angle in a steady state of the vehicle, and a yaw rate in a steady state of the vehicle.

5. The lane keeping assist system of claim 4, wherein the controller calculates the target steering angle by the following equation:

$$\delta_{cmd} = k_p \cdot \delta_{ss} \cdot \frac{YR_d}{YR_{SS}}$$

where $\delta_{cmd}$ is a target steering angle, $k_p$ is a proportional gain that is a control gain, $\delta_{ss}$ is a steering angle in a steady state, $YR_{SS}$ is a yaw rate in a steady state, and $YR_d$ is a target yaw rate.

6. The lane keeping assist system of claim 1, wherein the target route generator generates at least one of traveling paths to deviate from a boundary of the road, as the target route.

7. The lane keeping assist system of claim 1, wherein the target route generator generates multiple target routes for at least one of travelling paths for the vehicle to travel without deviating from the road up to any target and a path for the vehicle to travel without deviating from a given offset distance from the boundary of the road.

8. The lane keeping assist system of claim 1, wherein the target yaw rate calculator receives a plurality of target routes from the target route generator and calculates the target yaw rate for each target route.

9. A lane keeping assist method, comprising:
receiving at least one of an image sensing signal and a vehicle sensing signal of a vehicle and outputting traveling information about the vehicle;
generating a target route of the vehicle on the basis of the traveling information;
calculating a target yaw rate, a target behavior of the vehicle, on the basis of the target route;
determining a time point for starting lane keeping assist control on the basis of the traveling information and calculating a target steering angle using the target yaw rate; and
controlling a steering device of the vehicle according to the target steering angle,
wherein generating the target route of the vehicle comprises generating multiple target routes for at least one of travelling paths for the vehicle to travel without deviating from the road up to any target,
wherein calculating a target yaw rate comprises receiving a plurality of target routes from the target route generator and calculates the target yaw rate for each target route,
wherein calculating a target steering angle comprises selecting a target yaw rate appropriate for a traveling condition rate from among the target yaw rates for each target route and calculating the target steering angle using the selected target yaw rate,
wherein the calculating a target yaw rate comprises calculating a radius of curvature of the target route received from the target route generator and calculates the target yaw rate using the radius of curvature,
wherein the calculating a target yaw rate comprises calculating the radius of curvature using a distance to any target position of the vehicle and a deviation angle between the vehicle and the road,
wherein the calculating the target yaw rate calculator comprises calculating a radius of curvature of the target route; and calculating the target yaw rate using the radius of curvature and a speed of the vehicle,
wherein the calculating the target yaw rate comprises calculating the radius of curvature of the target route using the following equation:

$$R \cdot \cos(\phi + \alpha) = L/2$$

where R is a radius of curvature, $\phi$ is a deviation angle, $\alpha$ is an angle between a straight line to a target position and a straight line to a center of a circle having a road as an arc, and L is a distance to the target position,
wherein the generating target route comprises calculating coordinate $(x_i, y_i)$ on the target route for the vehicle to travel without deviating from the road to any target position, by the following equation:

$$x_i = \sqrt{L^2 - y_i^2}, \quad y_i = \frac{\rho_i(L^2 - \varepsilon_1^2)}{2(1 - \rho_i \varepsilon_i)} - \varepsilon_i$$

where L is any target distance, $\rho_i$ is a road curvature, and $\varepsilon_i$ is a lateral offset of a vehicle.

10. The lane keeping assist method of claim 9, wherein the calculating a target steering angle comprises calculating the target steering angle by the following equation:

$$\delta_{cmd} = k_p \cdot \delta_{ss} \cdot \frac{YR_d}{YR_{SS}}$$

where $\delta_{cmd}$ is a target steering angle, $k_p$ is a proportional gain that is a control gain, $\delta_{ss}$ is a steering angle in a steady state, $YR_{SS}$ is a yaw rate in a steady state, and $YR_d$ is a target yaw rate.

* * * * *